United States Patent
Leflaive et al.

(10) Patent No.: US 12,338,399 B2
(45) Date of Patent: Jun. 24, 2025

(54) HYDRODESULFURIZATION METHOD USING A CATALYST COMPRISING A FLASH ALUMINA SUPPORT

(71) Applicant: IFP Energies nouvelles, Rueil-Malmaison (FR)

(72) Inventors: Philibert Leflaive, Rueil-Malmaison (FR); Etienne Girard, Rueil-Malmaison (FR); Antoine Fecant, Rueil-Malmaison (FR); Charlie Blons, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 100 days.

(21) Appl. No.: 18/037,443

(22) PCT Filed: Nov. 18, 2021

(86) PCT No.: PCT/EP2021/082065
§ 371 (c)(1),
(2) Date: May 17, 2023

(87) PCT Pub. No.: WO2022/112077
PCT Pub. Date: Jun. 2, 2022

(65) Prior Publication Data
US 2024/0010933 A1    Jan. 11, 2024

(30) Foreign Application Priority Data
Nov. 27, 2020  (FR) ........................................ 2012315

(51) Int. Cl.
*C10G 45/08* (2006.01)

(52) U.S. Cl.
CPC ..... *C10G 45/08* (2013.01); *C10G 2300/1037* (2013.01); *C10G 2300/202* (2013.01); *C10G 2300/4006* (2013.01); *C10G 2300/4012* (2013.01); *C10G 2300/4018* (2013.01); *C10G 2300/70* (2013.01); *C10G 2400/02* (2013.01)

(58) Field of Classification Search
CPC .......... B01J 21/04; B01J 23/882; B01J 27/19; B01J 35/615; B01J 35/633; B01J 35/647; B01J 37/0009; B01J 37/0201; B01J 37/031; B01J 37/084; B01J 37/20; C10G 2300/1037; C10G 2300/202; C10G 2300/4006; C10G 2300/4012; C10G 2300/4018; C10G 2300/70; C10G 2400/02; C10G 45/08
See application file for complete search history.

(56) References Cited

U.S. PATENT DOCUMENTS

| | | |
|---|---|---|
| 3,287,280 A | 11/1966 | Colgan et al. |
| 4,880,525 A | 11/1989 | Kemp |
| 5,246,569 A | 9/1993 | Heinerman et al. |
| 6,746,598 B1 | 6/2004 | Zanibelli et al. |
| 7,807,044 B2 | 10/2010 | Roy-Auberger et al. |
| 7,981,828 B2 | 7/2011 | Devers et al. |
| 9,931,617 B2 | 4/2018 | Daudin et al. |
| 2005/0261124 A1 | 11/2005 | Yoshimura et al. |

FOREIGN PATENT DOCUMENTS

| | | | |
|---|---|---|---|
| CA | 2615225 A1 * | 6/2008 | ............. B01J 21/04 |
| CN | 109894122 A * | 6/2019 | |

OTHER PUBLICATIONS

CA2615225A1 Bib English Translation (Year: 2008).*
CA2615225A1 Claims English Translation (Year: 2008).*
CA2615225A1 Description English Translation (Year: 2008).*
CN109894122A Bib English Translation (Year: 2019).*
CN109894122A Claims English Translation (Year: 2019).*
CN109894122A Description English Translation (Year: 2019).*
International search report PCT/EP2021/082065 dated Jan. 20, 2022 (pp. 1-2).

* cited by examiner

*Primary Examiner* — Ellen M McAvoy
*Assistant Examiner* — Chantel Graham
(74) *Attorney, Agent, or Firm* — Millen, White, Zelano & Branigan, P.C.; Brion P. Heaney

(57) ABSTRACT

The invention relates to a method for hydrodesulfurization of a sulfur-containing olefinic gasoline cut wherein said gasoline cut, hydrogen and a catalyst comprising an alumina support obtained by dehydration of an aluminum hydroxide or oxyhydroxide at a temperature of between 400° C. and 1200° C. and for a time of between 0.1 seconds and 5 seconds, at least one metal from group VIB, at least one metal from group VIII, and phosphorus are brought into contact, the molar ratio between the phosphorus and the metal from group VIB being between 0.2 and 0.35.

21 Claims, No Drawings

HYDRODESULFURIZATION METHOD USING A CATALYST COMPRISING A FLASH ALUMINA SUPPORT

TECHNICAL FIELD

The present invention relates to the field of the hydrotreating of gasoline cuts, notably gasoline cuts resulting from fluidized-bed catalytic cracking units. More particularly, the present invention relates to the use of a catalyst in a process in the hydrodesulfurization of an olefinic gasoline cut containing sulfur, such as the gasolines resulting from catalytic cracking, for which it is sought to reduce the content of sulfur-comprising compounds, without hydrogenating the olefins and the aromatics.

STATE OF THE ART

Petroleum refining and also petrochemistry are now subject to new constraints. This is because all countries are gradually adopting strict sulfur specifications, the objective being to achieve, for example, 10 ppm by weight of sulfur in commercial gasolines in Europe and in Japan. The problem of reducing sulfur contents is essentially focused on the gasolines obtained by cracking, whether catalytic (FCC or Fluid Catalytic Cracking) or noncatalytic (coking, visbreaking, steam cracking), the main precursors of sulfur in gasoline pools.

One solution, well known to a person skilled in the art, for reducing the sulfur content consists in carrying out a hydrotreating (or hydrodesulfurization) of the hydrocarbon cuts (and in particular of catalytic cracking gasolines) in the presence of hydrogen and of a heterogeneous catalyst. However, this process exhibits the major disadvantage of causing a very significant drop in the octane number if the catalyst employed is not sufficiently selective. This reduction in the octane number is linked in particular to the hydrogenation of the olefins present in this type of gasoline concomitantly with the hydrodesulfurization. Unlike other hydrotreating processes, the hydrodesulfurization of gasolines thus has to make it possible to respond to a double antagonistic constraint: to provide extreme hydrodesulfurization of the gasolines and to limit the hydrogenation of the unsaturated compounds present.

One way of responding to this double problem consists in employing hydrodesulfurization catalysts which are both active in hydrodesulfurization and also very selective in hydrodesulfurization with respect to the reaction for the hydrogenation of the olefins.

For many years, it has been demonstrated that the addition of phosphorus to the catalyst improves the desulfurization activity (cf. for example U.S. Pat. No. 3,287,280). This is generally added in the form of phosphoric acid in the impregnation solution during the preparation of the catalyst. Patent application US 2005/0261124 provides for the addition of phosphorus in proportions ranging from 0.5% to 10% by weight of phosphorus with respect to the weight of the catalyst and U.S. Pat. No. 6,746,598 B1 proportions ranging from 0.1% to 10% by weight. Phosphorus is also used as dopant for the activity for the hydrodesulfurization of hydrocarbon feedstocks, as illustrated by patents U.S. Pat. Nos. 4,880,525 and 5,246,569.

Patent EP 2 925 433 discloses catalysts, the active phase of which, based on CoMoP, is deposited on a support obtained from a kneaded and extruded boehmite gel. The P/Mo molar ratio of these catalysts is between 0.1 and 0.3. In this document, it has been demonstrated that this type of catalyst exhibits an activity in hydrodesulfurization but also a selectivity in hydrodesulfurization with respect to the hydrogenation of the olefins which are improved in comparison with CoMoP catalysts comprising a support obtained from flash alumina, i.e. obtained by rapid dehydration of a hydrargillite. The CoMoP-on-flash alumina support catalysts disclosed have a P/Mo molar ratio of 0.15.

U.S. Pat. No. 7,981,828 discloses catalysts, the active phase of which, based on CoMoP, is deposited on a support composed of alumina having a specific surface of less than 135 $m^2/g$. The P/Mo molar ratio of these catalysts is between 0.27 and 2.00 for a more heightened technical effect in the range located between 0.50 and 0.95. This preferred range of P/Mo molar ratios makes possible an improvement in the selectivity with, nevertheless, a decrease in the desulfurizing activity.

There thus still exists today a keen interest among refiners for hydrodesulfurization catalysts, in particular for the hydrodesulfurization of gasoline cuts, which exhibit catalytic performance qualities which are improved, in particular in terms of catalytic activity in hydrodesulfurization and/or of selectivity, and which thus, once employed, make it possible to produce a gasoline having a low sulfur content without severe reduction in the octane number.

In this context, one of the objectives of the present invention is to provide a process for the hydrodesulfurization of a sulfur-containing olefinic gasoline cut, in the presence of a supported catalyst exhibiting performance qualities in activity and in selectivity which are at least as good as, indeed even better than, those of the known processes of the state of the art.

SUBJECT MATTERS OF THE INVENTION

A subject matter of the present invention is a process for the hydrodesulfurization of a sulfur-containing olefinic gasoline cut in which said gasoline cut, hydrogen and a catalyst are brought into contact, said hydrodesulfurization process being carried out at a temperature of between 200° C. and 400° C., a total pressure of between 1 and 3 MPa, an hourly space velocity, defined as being the flow rate by volume of feedstock relative to the volume of the catalyst, of between 1 and 10 $h^{-1}$ and a hydrogen/gasoline cut ratio by volume of between 100 and 600 Sl/l, said catalyst comprising an alumina support obtained by dehydration of an aluminum hydroxide or oxyhydroxide at a temperature of between 400 and 1200° C. and for a period of time of between 0.1 second and 5 seconds, at least one metal from group VIb, at least one metal from group VIII and phosphorus, the molar ratio of the phosphorus to the metal from group VIb being between 0.2 and 0.35.

The applicant company has surprisingly discovered that the use of a catalyst based on at least one metal from group VIb, on at least one metal from group VIII and on phosphorus, with a specific molar ratio of the element from group VIb to the phosphorus, on a support obtained by dehydration of an aluminum hydroxide or of an aluminum oxyhydroxide, in a hydrodesulfurization process, makes it possible to improve the catalytic performance qualities of said process, in terms of catalytic activity and in terms of selectivity. This results in a better conversion of the feedstock under identical operating conditions to those used in the prior art. This is because, without being committed to any one scientific theory, the employment of a catalyst comprising an active phase with a well-defined composition of metals from groups VIb and VIII and of phosphorus (with a specific molar ratio of the element from group VIb to the phosphorus) makes it possible to maximize the sulfurization of the active phase, thus making it possible to promote the activity in hydrodesulfurization; on the other hand, the use of a support prepared by the "flash" route makes it possible to optimize the interactions between the surface of the support and the active phase, inducing an improved selectivity of the catalysts.

According to one or more embodiments, the molar ratio of the phosphorus to the metal from group VIb is between 0.23 and 0.35.

According to one or more embodiments, the molar ratio of the metal from group VIII to the metal from group VIb of the catalyst is between 0.1 and 0.8.

According to one or more embodiments, the content of metal from group VIb of said catalyst, expressed in oxide form, is between 1% and 30% by weight, with respect to the total weight of the catalyst.

According to one or more embodiments, the content of metal from group VIII of said catalyst, expressed in oxide form, is between 0.3% and 10% by weight, with respect to the total weight of said catalyst.

According to one or more embodiments, the phosphorus content, expressed in $P_2O_5$ form, is between 0.1% and 10% by weight with respect to the total weight of said catalyst.

According to one or more embodiments, the group VIII metal is cobalt.

According to one or more embodiments, the metal from group VIb is molybdenum.

According to one or more embodiments, the alumina support is provided in the form of beads.

According to one or more embodiments, when the alumina support is in the form of beads, said alumina support is obtained by a preparation process comprising the following stages:
 s1) dehydration of an aluminum hydroxide or of an aluminum oxyhydroxide at a temperature of between 400° C. and 1200° C., preferably between 600° C. and 900° C., for a period of time of between 0.1 second and 5 seconds, preferably between 0.1 second and 4 seconds, in order to obtain an alumina powder;
 s2) shaping of said alumina powder obtained in stage s1) in the form of beads;
 s3) heat treatment of the beads obtained in stage s2) at a temperature of greater than or equal to 200° C., preferably of between 200° C. and 1200° C., more preferentially between 300° C. and 800° C. and more preferentially still between 300° C. and 750° C.

According to one or more embodiments, when the alumina support is in the form of beads, said alumina support is obtained by a preparation process additionally comprising the following stages:
 s4) hydrothermal treatment of the material obtained on conclusion of stage s3) by impregnation with water or an aqueous solution, then residence in an autoclave at a temperature of between 100° C. and 300° C.;
 s5) calcination of the material obtained on conclusion of stage s4) at a temperature of between 500° C. and 1100° C.

According to one or more embodiments, the alumina support in the form of beads exhibits a specific surface of between 50 and 420 m²/g.

According to one or more embodiments, the alumina support in the form of beads exhibits a specific surface of between 50 and 210 m²/g.

According to one or more embodiments, the alumina support is provided in the form of extrudates.

According to one or more embodiments, the alumina support in the form of extrudates is obtained by a preparation process comprising the following stages:
 s1') dehydration of an aluminum hydroxide or of an aluminum oxyhydroxide at a temperature of between 400° C. and 1200° C., preferably between 600° C. and 900° C., for a period of time of between 0.1 second and 5 seconds, preferably between 0.1 second and 4 seconds, in order to obtain an alumina-based material;
 s2') kneading and extrusion of the alumina-based material obtained on conclusion of stage
 s1') in order to obtain an extruded material;
 s3') heat treatment at a temperature of greater than or equal to 200° C.;
 s4') hydrothermal treatment of said material obtained on conclusion of stage s3') by impregnation with water or an aqueous solution, preferentially an acidic aqueous solution, then residence in an autoclave at a temperature of between 100° C. and 300° C., preferably between 150° C. and 250° C.;
 s5') calcination of the material obtained on conclusion of stage s4') at a temperature of between 500° C. and 1100° C., preferentially between 550° C. and 800° C.

According to one or more embodiments, the alumina support in the form of extrudates exhibits a specific surface of between 50 and 210 m²/g.

According to one or more embodiments, said aluminum hydroxide or aluminum oxyhydroxide is hydrargillite.

According to one or more embodiments, the gasoline is a gasoline resulting from a catalytic cracking unit.

DETAILED DESCRIPTION OF THE INVENTION

1. Definitions

Subsequently, the groups of chemical elements are given according to the CAS classification (CRC Handbook of Chemistry and Physics, published by CRC Press, editor-in-chief D. R. Lide, 81st edition, 2000-2001). For example, group VIII according to the CAS classification corresponds to the metals of columns 8, 9 and 10 according to the new IUPAC classification.

The total pore volume is measured by mercury porosimetry according to the standard ASTM D4284-92 with a wetting angle of 140°, for example using an Autopore III™ device of the Micromeritics™ brand.

The BET specific surface is measured by nitrogen physisorption according to the standard ASTM D3663-03, a method described in the work by Rouquerol F., Rouquerol J. and Singh K., "*Adsorption by Powders & Porous Solids: Principles, Methodology and Applications*", Academic Press, 1999.

The contents of metal from group VIII, of metal from group VIb and of phosphorus are measured by X-ray fluorescence.

2. Description

Preparation of the Support

The alumina support of the catalyst used in the context of the process according to the invention is obtained by using a precursor of aluminum hydroxide or oxyhydroxide type, preferably hydrargillite, for example resulting from the process commonly called the "Bayer" process, said precursor being rapidly dehydrated. This method is in particular described in detail in the document by P. Euzen, P. Raybaud, X. Krokidis, H. Toulhoat, J. L. Le Loarer, J. P. Jolivet and C. Froidefond, *Alumina, in Handbook of Porous Solids*, edited by F. Schüth, K. S. W. Sing and J. Weitkamp, Wiley-VCH, Weinheim, Germany, 2002, pp. 1591-1677. This method makes it possible to produce an alumina commonly called "flash alumina".

According to a first alternative form, the support used in the context of the process according to the invention is provided in the form of beads. The preparation of the support comprises the following stages:

s1) dehydration of an aluminum hydroxide or of an aluminum oxyhydroxide at a temperature of between 400° C. and 1200° C., preferably between 600° C. and 900° C., for a period of time of between 0.1 second and 5 seconds, preferably between 0.1 second and 4 seconds, in order to obtain an alumina powder;

s2) shaping of said alumina powder obtained in stage s1) in the form of beads;

s3) heat treatment of the beads obtained in stage s2) at a temperature of greater than or equal to 200° C., preferably of between 200° C. and 1200° C., more preferentially between 300° C. and 800° C. and more preferentially still between 300° C. and 750° C.

Advantageously, stage s1) is carried out in the presence of a stream of hot gas, such as dry air or humid air, making it possible to quickly remove and entrain the evaporated water. The aluminum hydroxide can be chosen from hydrargillite, gibbsite or bayerite. The aluminum oxyhydroxide can be chosen from boehmite or diaspore.

Preferably, stage s1) is carried out by using hydrargillite.

Advantageously, stage s1) can be carried out at least twice before carrying out stage s2).

Preferably, the alumina powder obtained on conclusion of stage s1) is ground to a particle size of between 10 and 200 µm before being shaped according to stage s2).

Generally, the alumina powder obtained on conclusion of stage s1) is washed with water or an acidic aqueous solution. When the washing stage is carried out with an acidic aqueous solution, any inorganic or organic acid can be used, preferably nitric or sulfuric acid for the inorganic acids and a carboxylic acid (formic, acetic or malonic acid), a sulfonic acid (para-toluenesulfonic acid) or a sulfuric ester (lauryl sulfate) for the organic acids.

Stage s2) of shaping the support of the catalyst in the form of beads is generally carried out by means of a rotating technology, such as a rotating granulator or a rotating drum. This type of process, well known to a person skilled in the art, called granulation, makes it possible to obtain beads with a diameter and with a distribution of pores which are controlled, these dimensions and these distributions generally being created during the agglomeration stage. The porosity can be created by different means, such as the choice of the particle size distribution of the alumina powder or the agglomeration of several alumina powders with different particle size distributions. Preferably, the alumina support is shaped in the form of beads, the diameter of which is preferably between 0.8 and 10 mm and more preferentially between 1 and 5 mm. Preferably, the shaping stage s2) is carried out so as to obtain alumina beads comprising a raw filling density of between 500 and 1100 $kg/m^3$, preferentially between 700 and 950 $kg/m^3$.

According to an alternative subembodiment, during stage s2) described above, another shaping method for obtaining the support consists in mixing, with the alumina powder obtained on conclusion of stage s1), before or during the agglomeration stage, one or more compounds called pore-forming compounds, which disappear on heating and thus create a porosity in the beads. Mention may be made, as pore-forming compounds used, by way of example, of wood flour, charcoal, carbon black, sulfur, tars, plastics or emulsions of plastics, such as polyvinyl chloride, polyvinyl alcohols, naphthalene or the like. The amount of pore-forming compounds added is determined by the volume desired.

According to stage s3), the alumina powder shaped in the form of beads is heat-treated at a temperature of greater than or equal to 200° C., preferably of between 200° C. and 1200° C., preferably between 300° C. and 800° C., more preferentially between 300° C. and 750° C., for a period of time of generally between 1 and 24 hours, preferably between 1 and 6 hours. On conclusion of stage s3), the alumina beads obtained comprise a specific surface of between and 420 $m^2/g$, preferably between 60 and 350 $m^2/g$ and more preferentially still between 80 and 300 $m^2/g$.

In an alternative embodiment according to the invention, the alumina beads obtained on conclusion of stage s3) additionally undergo a stage s4) of hydrothermal treatment by impregnation of said alumina beads with water or an aqueous solution, preferably an acidic aqueous solution, then said alumina beads reside in an autoclave at a temperature of between 100° C. and 300° C., preferably between 150° C. and 250° C., in order to obtain agglomerates. The hydrothermal treatment stage s4) is generally carried out at a temperature of 100° C. to 300° C., preferably between 150° C. and 250° C., for a period of time of greater than 45 minutes, preferentially of between 1 hour and 24 hours, very preferentially between 1.5 hours and 12 hours. The hydrothermal treatment is generally carried out using an acidic aqueous solution comprising one or more inorganic and/or organic acids, preferably nitric acid, hydrochloric acid, perchloric acid, sulfuric acid, weak acids, the solution of which has a pH of less than 4, such as acetic acid or formic acid. Generally, said acidic aqueous solution also comprises one or more compounds which can release anions capable of combining with aluminum ions, preferably compounds comprising a nitrate (such as aluminum nitrate), chloride, sulfate, perchlorate, chloroacetate, trichloroacetate, bromoacetate or dibromoacetate ion, and anions of general formula R—COO, such as formates and acetates.

The agglomerates obtained on conclusion of stage s4) are subsequently subjected to a stage s5) of calcination at a temperature of between 500° C. and 1100° C., preferably between 550° C. and 1050° C., and for a period of time of generally between 1 and 24 hours, preferably between 1 and 6 hours. This calcination is generally carried out in order to obtain alumina beads with a specific surface of between 50 and 210 $m^2/g$, preferably between 70 and 180 $m^2/g$ and more preferentially still between 70 and 160 $m^2/g$.

According to a second alternative form, the support used in the context of the process according to the invention is provided in the form of an extrudate. According to this second alternative form, the preparation of the support comprises the following stages:

s1') dehydration of an aluminum hydroxide or of an aluminum oxyhydroxide at a temperature of between 400° C. and 1200° C., preferably between 600° C. and 900° C., for a period of time of between 0.1 second and 5 seconds, preferably between 0.1 second and 4 seconds, in order to obtain an alumina-based material;

s2') kneading and extrusion of the alumina-based material obtained on conclusion of stage s1') in order to obtain an extruded material;

s3') heat treatment at a temperature of greater than or equal to 200° C.;

s4') hydrothermal treatment of said material obtained on conclusion of stage s3') by impregnation with water or an aqueous solution, preferentially an acidic aqueous solution, then residence in an autoclave at a temperature of between 100° C. and 300° C., preferably between 150° C. and 250° C.;

s5') calcination of the material obtained on conclusion of stage s4') at a temperature of between 500° C. and 1100° C., preferentially between 550° C. and 800° C.

The aluminum hydroxide can be chosen from hydrargillite, gibbsite or bayerite. The aluminum oxyhydroxide can be chosen from boehmite or diaspore.

Preferably, stage s1') is carried out by using hydrargillite.

In stage s2'), during the shaping of said alumina-based material, one or more pore-forming materials which disappear on heating are generally added to it. Said pore-forming materials are selected from the group consisting of wood flour, charcoal, sulfur, tars, plastic materials, emulsions of plastic materials, polyvinyl alcohols and naphthalene.

In stage s3'), the material in the extrudate form obtained on conclusion of stage s2') is heat-treated at a temperature of greater than or equal to 200° C., preferably of between 200° C. and 1200° C., preferably between 300° C. and 800° C., more preferentially between 300° C. and 750° C., for a period of time of generally between 1 and 24 hours, preferably between 1 and 6 hours. On conclusion of stage s3'), the extruded material obtained comprises a specific surface of between 50 and 420 m$^2$/g, preferably between 60 and 350 m$^2$/g and more preferentially still between 80 and 300 m$^2$/g.

In stage s4'), the hydrothermal treatment is generally carried out at a temperature of 100° C. to 300° C., preferentially from 150° C. to 250° C., for a period of time of greater than 45 minutes, preferentially from 1 to 24 hours, very preferentially from 1.5 to 12 hours. The hydrothermal treatment is generally carried out using an acidic aqueous solution comprising one or more inorganic and/or organic acids, preferably nitric acid, hydrochloric acid, perchloric acid, sulfuric acid, weak acids, the solution of which has a pH of less than 4, such as acetic acid or formic acid. Generally, said acidic aqueous solution also comprises one or more compounds which can release anions capable of combining with aluminum ions, preferably compounds comprising a nitrate (such as aluminum nitrate), chloride, sulfate, perchlorate, chloroacetate, trichloroacetate, bromoacetate or dibromoacetate ion, and anions of general formula: R—COO, such as formates and acetates.

In stage s5'), the material obtained on conclusion of stage s4') is calcined at a temperature of between 500° C. and 1100° C., preferably between 550° C. and 1050° C., and for a period of time of generally between 1 and 24 hours, preferably between 1 and 6 hours. This calcination is generally carried out in order to obtain an extruded alumina with a specific surface of between 50 and 210 m$^2$/g, preferably between 70 and 180 m$^2$/g and more preferentially still between 70 and 160 m$^2$/g.

Thus, on conclusion of the process for the preparation of the support:
when the support is provided in the form of beads and when the preparation process does not comprise the hydrothermal treatment stage s4) and the calcination stage s5), the specific surface of the support is between 50 and 420 m$^2$/g, preferably between 60 and 350 m$^2$/g and more preferentially still between 80 and 300 m$^2$/g;
when the support is provided in the form of beads and when the preparation process comprises the hydrothermal treatment stage s4) and the calcination stage s5), the specific surface of said support is between 50 and 210 m$^2$/g, preferably between 70 and 180 m$^2$/g and more preferentially still between 70 and 160 m$^2$/g;
when the support is provided in the extrudate form, the specific surface of the support is between 50 and 210 m$^2$/g, preferably between 70 and 180 m$^2$/g and more preferentially still between 70 and 160 m$^2$/g.

The pore volume of the support is generally between 0.4 cm$^3$/g and 1.3 cm$^3$/g, preferably between 0.4 cm$^3$/g and 1.1 cm$^3$/g.

Catalyst

The catalyst used in the context of the hydrodesulfurization process according to the invention comprises an active phase formed of at least one metal from group VIb, of at least one metal from group VIII and of phosphorus.

The metal from group VIb present in the active phase of the catalyst is preferentially chosen from molybdenum and tungsten, more preferentially molybdenum. The metal from group VIII present in the active phase of the catalyst is preferentially chosen from cobalt, nickel and the mixture of these two elements, more preferentially cobalt.

The total content of metal from group VIII is generally between 0.3% and 10% by weight, expressed in the form of oxide of the metal from group VIII, with respect to the total weight of the catalyst, preferably between 0.4% and 8% by weight, preferably between 0.45% and 7% by weight, very preferably between 0.5% and 6% by weight and more preferably still of between 0.5% and 5% by weight, with respect to the total weight of the catalyst. When the metal is cobalt or nickel, the metal content is expressed as CoO or NiO respectively.

The content of metal from group VIb is generally between 1% and 30% by weight, expressed in the form of oxide of the metal from group VIb, with respect to the total weight of the catalyst, preferably between 2% and 20% by weight, preferably between 2% and 15% by weight, very preferably between 3% and 15% by weight, with respect to the total weight of the catalyst. When the metal is molybdenum or tungsten, the metal content is expressed as MoO$_3$ or WO$_3$ respectively.

The metal from group VIII to metal from group VIb molar ratio of the catalyst is generally between 0.1 and 0.8, preferably between 0.2 and 0.6, in a preferred way between 0.3 and 0.5 and more preferably still between 0.35 and 0.45.

The phosphorus content is generally between 0.1% and 10% by weight of P$_2$O$_5$, with respect to the total weight of catalyst, preferably between 0.3% and 5% by weight of P$_2$O$_5$, with respect to the total weight of catalyst, and more preferentially still between 0.4% and 3% by weight of P$_2$O$_5$, with respect to the total weight of catalyst.

The molar ratio of the phosphorus to the metal from group VIb is between 0.2 and 0.35, preferably between 0.23 and 0.35 and more preferentially still between 0.25 and 0.35. When the support is provided in the form of beads and when the preparation process does not comprise the hydrothermal treatment stage s4) and the calcination stage s5), the specific surface of the catalyst is between 40 and 350 m$^2$/g, preferably between 50 and 330 m$^2$/g and more preferentially still between 70 and 300 m$^2$/g.

When the support is provided in the form of beads and when the preparation process comprises the hydrothermal treatment stage s4) and the calcination stage s5), the specific surface of the catalyst is between 60 and 170 m$^2$/g and more preferentially still between 60 and 150 m$^2$/g.

When the support is provided in the extrudate form, the specific surface of the catalyst is between 60 and 170 m²/g and more preferentially still between 60 and 150 m²/g.

Preparation of the Catalyst

The introduction of the active phase onto the support can be carried out according to any method of preparation known to a person skilled in the art. The addition of the active phase to the support consists in bringing at least one component of a metal from group VIb, at least one component of a metal from group VIII and phosphorus into contact with the support, so as to obtain a catalyst precursor.

According to a first embodiment, said components of metals from group VIb, from group VIII and of phosphorus are deposited on said support, by one or more coimpregnation stages, that is to say that said components of the metals from group VIb, from group VIII and of phosphorus are introduced simultaneously into said support. The coimpregnation stage(s) are preferentially carried out by dry impregnation or by excess impregnation of solution. When this first embodiment comprises the implementation of several coimpregnation stages, each coimpregnation stage is preferably followed by a stage of intermediate drying, generally at a temperature of less than 200° C., advantageously of between 50 and 180° C., preferably between 60 and 150° C., very preferably between 75 and 140° C., for a period of time of 0.5 to 24 hours, preferably of 0.5 to 12 hours.

According to a preferred embodiment by coimpregnation, the impregnation solution is preferably an aqueous solution. Preferably, the aqueous impregnation solution, when it contains cobalt, molybdenum and phosphorus, is prepared under pH conditions which promote the formation of heteropolyanions in solution. For example, the pH of such an aqueous solution is between 1 and 5.

According to a second embodiment, the catalyst precursor is prepared by carrying out the successive depositions and in any order of a component of a metal from group VIb, of a component of a metal from group VIII and of phosphorus on said support. The depositions can be carried out by dry impregnation, by excess impregnation or also by deposition/precipitation, according to methods well known to a person skilled in the art. In this second embodiment, the deposition of the components of the metals from groups VIb and VIII and of phosphorus can be carried out by several impregnations with a stage of intermediate drying between two successive impregnations, generally at a temperature of less than 200° C., advantageously of between 50 and 180° C., preferably between 60 and 150° C., very preferably between 75 and 140° C., for a period of time of 0.5 to 24 hours, preferably of 0.5 to 12 hours.

Whatever the mode of deposition of the metals and of the phosphorus employed, the solvent which participates in the composition of the impregnation solutions is chosen so as to dissolve the metal precursors of the active phase, such as water or an organic solvent (for example an alcohol).

Use may be made, by way of example, among the sources of molybdenum, of the oxides and hydroxides, molybdic acids and their salts, in particular the ammonium salts, such as ammonium molybdate or ammonium heptamolybdate, phosphomolybdic acid ($H_3PMo_{12}O_{40}$) and their salts, and optionally silicomolybdic acid ($H_4SiMo_{12}O_{40}$) and its salts. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to a person skilled in the art. For example, use may be made, among the sources of tungsten, of the oxides and hydroxides, tungstic acids and their salts, in particular the ammonium salts, such as ammonium tungstate or ammonium metatungstate, phosphotungstic acid and their salts, and optionally silicotungstic acid ($H_4SiW_{12}O_{40}$) and its salts. The sources of tungsten can also be any heteropolycompound of Keggin, lacunary Keggin, substituted Keggin or Dawson type, for example. Use is preferably made of the oxides and the ammonium salts, such as ammonium metatungstate, or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example. Use is preferably made of nickel hydroxide and nickel hydroxycarbonate.

The phosphorus can advantageously be introduced into the catalyst at various steps of its preparation and in various ways. The phosphorus can be introduced during the shaping of said alumina support, or preferably after this shaping. It can advantageously be introduced alone or as a mixture with at least one of the metals from groups VIb and VIII. The phosphorus is preferably introduced as a mixture with the precursors of the metals from group VIb and from group VIII, completely or partially onto the shaped alumina support, by dry impregnation of said alumina support using a solution containing the precursors of the metals and the precursor of the phosphorus. The preferred source of phosphorus is orthophosphoric acid $H_3PO_4$, but its salts and esters, such as ammonium phosphates, or their mixtures are also suitable. The phosphorus can also be introduced at the same time as the element(s) from group VIb in the form, for example, of Keggin, lacunary Keggin, substituted Keggin or Strandberg-type heteropolyanions.

On conclusion of the stage or stages of bringing the metals from group VIII, from group VIb and the phosphorus into contact with the support, the precursor of the catalyst is subjected to a drying stage carried out by any technique known to a person skilled in the art. It is advantageously carried out at atmospheric pressure or at reduced pressure. Preferably, this stage is carried out at atmospheric pressure. This stage is carried out at a temperature of less than 200° C., preferably of between 50° C. and 180° C., preferably of between 60° C. and 150° C. and very preferably of between 75° C. and 140° C.

The drying stage is advantageously carried out in a traversed bed using air or any other hot gas. Preferably, when the drying is carried out in a traversed bed, the gas used is either air or an inert gas, such as argon or nitrogen. Very preferably, the drying is carried out in a traversed bed in the presence of air.

Preferably, this drying stage has a duration of between 30 minutes and 24 hours and preferably of between 1 hour and 12 hours.

On conclusion of the drying stage, a dried catalyst is obtained which can be used as hydrotreating catalyst after an activation phase (sulfidation stage).

According to an alternative form, the dried catalyst can be subjected to a subsequent calcination stage, for example under air, at a temperature of greater than or equal to 200° C. The calcination is generally carried out at a temperature of less than or equal to 600° C., preferably of between 200° C. and 600° C. and particularly preferably of between 250° C. and 500° C. The calcination time is generally between 0.5 hour and 16 hours, preferably between 1 hour and 6 hours. It is generally carried out under air. The calcination makes it possible to convert the precursors of the metals from groups VIb and VIII into oxides.

Before its use as hydrotreating catalyst, it is advantageous to subject the dried or optionally calcined catalyst to a sulfidation stage (activation phase). This activation phase is carried out by methods well known to a person skilled in the art, and advantageously under a sulfo-reductive atmosphere in the presence of hydrogen and of hydrogen sulfide. The hydrogen sulfide can be used directly or generated by a sulfide agent (such as dimethyl disulfide).

Process for the Hydrodesulfurization of Gasoline

The hydrotreating process consists in bringing the sulfur-containing olefinic gasoline cut into contact with a catalyst as described above and hydrogen under the following conditions:
- a temperature of between 200° C. and 400° C., preferably of between 230° C. and 330° C.;
- at a total pressure of between 1 and 3 MPa, preferably of between 1.5 and 2.5 MPa;
- an hourly space velocity (HSV), defined as being the flow rate by volume of feedstock relative to the volume of catalyst, of between 1 and 10 $h^{-1}$, preferably of between 2 and 6 $h^{-1}$;
- a hydrogen/gasoline feedstock ratio by volume of between 100 and 600 Sl/l, preferably of between 200 and 400 Sl/l.

Thus, the process according to the invention makes it possible to treat any type of sulfur-containing olefinic gasoline cut, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracking gasoline). Said feedstock preferably consists of a gasoline cut resulting from a catalytic cracking unit.

The feedstock is advantageously a gasoline cut containing sulfur-comprising compounds and olefins and has a boiling point of between 30° C. and less than 250° C., preferably between 35° C. and 240° C. and in a preferred way between 40° C. and 220° C.

The sulfur content of the gasoline cuts produced by catalytic cracking (FCC) depends on the sulfur content of the feedstock treated by the FCC, the presence or not of a pretreatment of the feedstock of the FCC, as well as on the end point of the cut. Generally, the sulfur contents of the whole of a gasoline cut, in particular those originating from the FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, including generally less than 300 ppm of mercaptans. The mercaptans are generally concentrated in the light fractions of the gasoline and more specifically in the fraction, the boiling point of which is less than 120° C.

It should be noted that the sulfur-comprising compounds present in the gasoline can also comprise heterocyclic sulfur-comprising compounds, such as, for example, thiophenes, alkylthiophenes or benzothiophenes. These heterocyclic compounds, unlike mercaptans, cannot be removed by extractive processes. These sulfur-comprising compounds are consequently removed by a hydrotreating, which leads to their transformation into hydrocarbons and $H_2S$.

Preferably, the gasoline treated by the process according to the invention is a heavy gasoline (or HCN for Heavy Cracked Naphtha) resulting from a distillation stage aimed at separating a broad cut of the gasoline resulting from a cracking process (or FRCN for Full Range Cracked Naphtha) into a light gasoline (LCN for Light Cracked Naphtha) and a heavy gasoline HCN. The cut point of the light gasoline and of the heavy gasoline is determined in order to limit the sulfur content of the light gasoline and to make it possible to use it in the gasoline pool, preferably without additional post-treatment. Advantageously, the broad cut FRCN is subjected to a selective hydrogenation stage before the distillation stage.

EXAMPLES

Example 1: Catalyst A (According to the Invention)

The support S1 of the catalyst A, which is provided in the form of beads, is obtained by dehydration by flash calcination of hydrargillite (Emplura®, Merck™) in order to obtain an active alumina powder. A stream of hot gas makes it possible to very rapidly remove and entrain the evaporated water. The temperature is set at 800° C. and the contact time of the material to be dehydrated with the gases is 1 second. The active alumina powder obtained is ground to a particle size of between 10 and 200 μm and then washed with water. The alumina powder is subsequently shaped in the form of beads by a granulator. An amount of carbon black (N990, Thermax®) is adjusted in order to obtain beads with a raw filling density of 785 kg/$m^3$ and with a diameter of between 2 and 4 mm after sieving. After heat treatment at 720° C. for 2 hours, the beads exhibit a specific surface of 200 $m^2$/g. The beads are subsequently subjected to a hydrothermal treatment by impregnation with an acidic aqueous solution. The hydrothermal treatment is carried out at a temperature of 200° C. for 6.5 hours, in a rotating basket autoclave, and the impregnation solution is an acidic aqueous solution comprising aluminum nitrate (0.1N, Merck™). The agglomerates obtained are subsequently calcined at a temperature of 650° C. for 2 hours. An alumina support S1 is obtained in the form of beads comprising a specific surface of 146 $m^2$/g and a total pore volume of 0.99 $cm^3$/g.

The support S1 exhibits a water uptake volume of 0.95 ml/g. The impregnation solution is prepared by heating, at 90° C. for 3 hours, 1.15 grams of molybdenum oxide ($MoO_3$>99.5%, Merck™), 0.30 gram of cobalt hydroxide (95% Co(OH)$_2$, Merck™) and 0.26 gram of phosphoric acid (85% $H_3PO_4$, Merck™) in 9.3 ml of distilled water. After dry impregnation of 10 grams of support and a maturation stage for 12 hours under an atmosphere saturated with moisture, the solid is dried at 120° C. for 12 hours. The solid is subsequently calcined under air at 450° C. for 2 hours. The catalyst A obtained contains 2.0% by weight of CoO, 10% by weight of $MoO_3$ and 1.4% by weight of $P_2O_5$, with respect to the total weight of the catalyst, i.e. a Co/Mo atomic ratio of 0.38 and a P/Mo atomic ratio of 0.28. The catalyst A has a total pore volume of 0.84 ml/g and a specific surface of 118 m²/g. The contents of the metals, measured in their oxide form, are shown in table 1 below.

Example 2: Catalyst B (According to the Invention)

The support S2 of the catalyst B, which is provided in the form of beads, is obtained by dehydration by flash calcination of hydrargillite (Emplura®, Merck™) in order to obtain an active alumina powder. A stream of hot gas makes it possible to very rapidly remove and entrain the evaporated water. The temperature is set at 800° C. and the contact time of the material to be dehydrated with the gases is 1 second. The active alumina powder obtained is ground to a particle size of between 10 and 200 µm and then washed with water. The alumina powder is subsequently shaped in the form of beads by a granulator. The beads have a raw filling density of 785 kg/m³ and a diameter of between 2 and 4 mm after sieving. After heat treatment at 720° C. for 2 hours, an alumina support S2 is obtained in the form of beads exhibiting a specific surface of 200 m²/g and a total pore volume of 0.75 cm³/g.

The support S2 exhibits a water uptake volume of 0.73 ml/g. The impregnation solution is prepared by heating, at 90° C. for 3 hours, 1.15 grams of molybdenum oxide ($MoO_3$>99.5%, Merck™), 0.30 gram of cobalt hydroxide (95% $Co(OH)_2$, Merck™) and 0.26 gram of phosphoric acid (85% $H_3PO_4$, Merck™) in 7.1 ml of distilled water. After dry impregnation of 10 grams of support and a maturation stage for 12 hours under an atmosphere saturated with moisture, the solid is dried at 120° C. for 12 hours. The solid is subsequently calcined under air at 450° C. for 2 hours. The catalyst B obtained contains 2.0% by weight of CoO, 10% by weight of $MoO_3$ and 1.4% by weight of $P_2O_5$, with respect to the total weight of the catalyst, i.e. a Co/Mo atomic ratio of 0.38 and a P/Mo atomic ratio of 0.28. The catalyst B has a total pore volume of 0.65 ml/g and a specific surface of 118 m²/g. The contents of the metals, measured in their oxide form, are shown in table 1 below.

Example 3: Catalyst C (Not in Accordance)

In this not-in-accordance example, the P/Mo ratio is less than 0.2.

The catalyst C is prepared on a support S1 according to example 1. The impregnation solution is prepared by heating, at 90° C. for 3 hours, 1.15 grams of molybdenum oxide ($MoO_3$>99.5%, Merck™), 0.30 gram of cobalt hydroxide (95% $Co(OH)_2$, Merck™) and 0.14 gram of phosphoric acid (85% $H_3PO_4$, Merck™) in 9.3 ml of distilled water. After dry impregnation of 10 grams of support and a maturation stage for 12 hours under an atmosphere saturated with moisture, the solid is dried at 120° C. for 12 hours. The solid is subsequently calcined under air at 450° C. for 2 hours. The catalyst C obtained contains 2.0% by weight of CoO, 10% by weight of $MoO_3$ and 0.75% by weight of $P_2O_5$, i.e. a Co/Mo atomic ratio of 0.38 and a P/Mo atomic ratio of 0.15. The catalyst C has a total pore volume of 0.85 ml/g and a specific surface of 120 m²/g. The contents of the metals, measured in their oxide form, are shown in table 1 below.

Example 4: Catalyst D (Not in Accordance)

In this not-in-accordance example, the P/Mo ratio is greater than 0.35.

The catalyst D is prepared on a support S1 according to example 1. The impregnation solution is prepared by heating, at 90° C. for 3 hours, 1.15 grams of molybdenum oxide ($MoO_3$>99.5%, Merck™), 0.30 gram of cobalt hydroxide (95% $Co(OH)_2$, Merck™) and 0.48 gram of phosphoric acid (85% $H_3PO_4$, Merck™) in 9.3 ml of distilled water. After dry impregnation of 10 grams of support and a maturation stage for 12 hours under an atmosphere saturated with moisture, the solid is dried at 120° C. for 12 hours. The solid is subsequently calcined under air at 450° C. for 2 hours. The catalyst D obtained contains 2.0% by weight of CoO, 10% by weight of $MoO_3$ and 2.55% by weight of $P_2O_5$, i.e. a Co/Mo atomic ratio of 0.38 and a P/Mo atomic ratio of 0.52. The catalyst D has a total pore volume of 0.82 ml/g and a specific surface of 117 m²/g. The contents of the metals, measured in their oxide form, are shown in table 1 below.

Example 5: Catalyst E (Not in Accordance)

In this not-in-accordance example, the alumina support was not obtained by dehydration of an aluminum hydroxide or oxyhydroxide.

The support S4, which is provided in the extrudate form, is obtained by kneading a boehmite powder (Sasol®) in a closed vessel of a double Z-arm kneader (Guittard®) of MX type. A peptizing agent (nitric acid, $HNO_3$) is added up to 4 g/100 g of boehmite. Water is also gradually introduced in order to achieve a loss on ignition in the vicinity of 50%, the value being adjusted in order to obtain a homogeneous and cohesive paste. The paste is subsequently extruded using a piston extruder through a die with a diameter of 1.8 mm. The extrudates thus obtained are dried at 120° C. for 12 h and then calcined at a temperature of 900° C. for 2 hours. The extrudates obtained exhibit a specific surface of 140 m²/g and a total pore volume of 0.73 cm³/g.

The support S4 exhibits a water uptake volume of 0.72 ml/g. The impregnation solution is prepared by heating, at 90° C. for 3 hours, 1.15 grams of molybdenum oxide ($MoO_3$>99.5%, Merck™), 0.30 gram of cobalt hydroxide (95% $Co(OH)_2$, Merck™) and 0.26 gram of phosphoric acid (85% $H_3PO_4$, Merck™) in 7.0 ml of distilled water. After dry impregnation of 10 grams of support and a maturation stage for 12 hours under an atmosphere saturated with moisture, the solid is dried at 120° C. for 12 hours. The solid is subsequently calcined under air at 450° C. for 2 hours. The catalyst E obtained contains 2.0% by weight of CoO, 10% by weight of $MoO_3$ and 1.4% by weight of $P_2O_5$, i.e. a Co/Mo atomic ratio of 0.38 and a P/Mo atomic ratio of 0.28. The catalyst E has a total pore volume of 0.63 ml/g and a specific surface of 118 m²/g. The contents of the metals, measured in their oxide form, are shown in table 1 below.

TABLE 1

| | Catalyst | | | | |
| --- | --- | --- | --- | --- | --- |
| | A (in accordance) | B (in accordance) | C (not in accordance) | D (not in accordance) | E (not in accordance) |
| Support | S1 | S2 | S1 | S1 | S4 |
| $S_{BET}$ (m²/g - catalyst) | 118 | 118 | 120 | 117 | 118 |
| CoO (% by weight) | 2 | 2 | 2 | 2 | 2 |
| $MoO_3$ (% by weight) | 10 | 10 | 10 | 10 | 10 |
| $P_2O_5$ (% by weight) | 1.4 | 1.4 | 0.75 | 2.55 | 1.4 |

TABLE 1-continued

| | Catalyst | | | | |
|---|---|---|---|---|---|
| | A (in accordance) | B (in accordance) | C (not in accordance) | D (not in accordance) | E (not in accordance) |
| P/Mo (mol/mol) | 0.28 | 0.28 | 0.15 | 0.52 | 0.28 |

Characteristics of the catalysts A, B, C, D and E

Example 6: Evaluation of the Performance Qualities of the Catalysts Employed in a Hydrodesulfurization Reactor A model feedstock representative of a catalytic cracking gasoline containing 10% by weight of 2,3-dimethylbut-2-ene and 0.33% by weight of 3-methylthiophene (i.e. 1000 ppm by weight of sulfur in the feedstock) is used for the evaluation of the catalytic performance qualities of the various catalysts. The solvent used is heptane.

The hydrodesulfurization reaction (HDS) is carried out in a fixed traversed bed reactor under a total pressure of 1.5 MPa, at 210° C., at HSV=6 h$^{-1}$ (HSV=flow rate by volume of feedstock/volume of catalyst) and an H$_2$/feedstock ratio by volume of 300 Sl/l, in the presence of 4 ml of catalyst. Prior to the HDS reaction, the catalyst is sulfided in situ at 350° C. for 2 hours under a flow of hydrogen containing 15 mol % of H$_2$S at atmospheric pressure.

Each of the catalysts is placed successively in said reactor. Samples are taken at different time intervals and are analyzed by gas chromatography so as to observe the disappearance of the reactants and the formation of the products.

The catalytic performance qualities of the catalysts are evaluated in terms of catalytic activity and of the selectivity. The hydrodesulfurization (HDS) activity is expressed from the rate constant for the HDS reaction of 3-methylthiophene (kHDS), standardized by the volume of catalyst introduced, and assuming first order kinetics with respect to the sulfur-comprising compound. The activity for hydrogenation of the olefins (HydO) is expressed from the rate constant for the hydrogenation reaction of 2,3-dimethylbut-2-ene, standardized by the volume of catalyst introduced, and assuming first order kinetics with respect to the olefin.

The selectivity of the catalyst is expressed by the standardized ratio of the rate constants kHDS/kHydO. The kHDS/kHydO ratio will increase as the catalyst becomes more selective. The values obtained are standardized by taking the catalyst A as reference (relative HDS activity and relative selectivity equal to 100). The performance qualities are thus the relative HDS activity and the relative selectivity.

TABLE 2

| Catalysts | A | B | C | D | E |
|---|---|---|---|---|---|
| Relative HDS activity | 100 | 119 | 87 | 71 | 105 |
| Relative selectivity | 100 | 98 | 92 | 108 | 75 |

The joint improvement in the activity and in the selectivity of the catalysts in accordance with the invention is particularly advantageous in the case of employment in a process for the hydrodesulfurization of gasoline containing olefins for which it is sought to limit as much as possible the loss of the octane number due to the hydrogenation of the olefins.

The invention claimed is:

1. A process for the hydrodesulfurization of a sulfur-containing olefinic gasoline cut, comprising:
   bringing said gasoline cut, hydrogen and a catalyst into contact, and carrying out said hydrodesulfurization process at a temperature of between 200° C. and 400° C., a total pressure of between 1 and 3 MPa, an hourly space velocity, defined as being the flow rate by volume of feedstock relative to the volume of the catalyst, of between 1 and 10 h-1 and a hydrogen/gasoline cut ratio by volume of between 100 and 600 Sl/l,
   wherein said catalyst comprises an alumina support obtained by dehydration of an aluminum hydroxide or oxyhydroxide at a temperature of between 400 and 1200° C. and for a period of time of between 0.1 second and 5 seconds, at least one metal from group VIb, at least one metal from group VIII, and phosphorus, the molar ratio of the phosphorus to the metal from group VIb being between 0.2 and 0.35.

2. The process as claimed in claim 1, in which the molar ratio of the phosphorus to the metal from group VIb is between 0.23 and 0.35.

3. The process as claimed in claim 1, in which the molar ratio of the metal from group VIII to the metal from group VIb of the catalyst is between 0.1 and 0.8.

4. The process as claimed in claim 1, in which the content of metal from group VIb of said catalyst, expressed in oxide form, is between 1% and 30% by weight, with respect to the total weight of the catalyst.

5. The process as claimed in claim 1, in which the content of metal from group VIII of said catalyst, expressed in oxide form, is between 0.3% and 10% by weight, with respect to the total weight of said catalyst.

6. The process as claimed in claim 1, in which the phosphorus content, expressed in P$_2$O$_5$ form, is between 0.1% and 10% by weight, with respect to the total weight of said catalyst.

7. The process as claimed in claim 1, in which the metal from group VIII is cobalt.

8. The process as claimed in claim 1, in which the metal from group VIb is molybdenum.

9. The process as claimed in claim 1, in which the alumina support is provided in the form of beads.

10. The process as claimed in claim 9, in which the alumina support in the form of beads is obtained by a preparation process comprising the following stages:
    s1) dehydration of an aluminum hydroxide or of an aluminum oxyhydroxide at a temperature of between 400° C. and 1200° C. for a period of time of between 0.1 second and 5 seconds in order to obtain an alumina powder;
    s2) shaping of said alumina powder obtained in stage s1) in the form of beads;
    s3) heat treatment of the beads obtained in stage s2) at a temperature of greater than or equal to 200° C..

11. The process as claimed in claim 10, in which the alumina support in the form of beads is obtained by a preparation process additionally comprising the following stages:
    s4) hydrothermal treatment of the material obtained on conclusion of stage s3) by impregnation with water or an aqueous solution, then residence in an autoclave at a temperature of between 100° C. and 300° C.:
    s5) calcination of the material obtained on conclusion of stage s4) at a temperature of between 500° C. and 1100° C.

12. The process as claimed in claim 10, in which the alumina support in the form of beads exhibits a specific surface of between 50 and 420 m²/g.

13. The process as claimed in claim 11, in which the alumina support in the form of beads exhibits a specific surface of between 50 and 210 m²/g.

14. The process as claimed in claim 1, in which the alumina support is provided in the form of extrudates.

15. The process as claimed in claim 14, in which the alumina support in the form of extrudates is obtained by a preparation process comprising the following stages:
- s1') dehydration of an aluminum hydroxide or of an aluminum oxyhydroxide at a temperature of between 400° C. and 1200° C. for a period of time of between 0.1 second and 5 seconds in order to obtain an alumina-based material;
- s2') kneading and extrusion of the alumina-based material obtained on conclusion of stage s1') in order to obtain an extruded material;
- s3') heat treatment at a temperature of greater than or equal to 200° C.;
- s4') hydrothermal treatment of said material obtained on conclusion of stage s3') by impregnation with water or an aqueous solution, preferentially an acidic aqueous solution, then residence in an autoclave at a temperature of between 100° C. and 300° C.;
- s5') calcination of the material obtained on conclusion of stage s4') at a temperature of between 500° C. and 1100° C..

16. The process as claimed in claim 15, in which the alumina support in the form of extrudates exhibits a specific surface of between 50 and 210 m²/g.

17. The process as claimed in claim 1, in which said aluminum hydroxide or aluminum oxyhydroxide is hydrargillite.

18. The process as claimed in claim 1, in which the gasoline is a gasoline resulting from a catalytic cracking unit.

19. The process according to claim 10, wherein the s1) dehydration is performed at a temperature of between 600° C. and 900° C., for a period of time between 0.1 second and 4 seconds, in order to obtain an alumina powder.

20. The process according to claim 10, wherein the s3) is performed at a temperature of between 200° C. and 1200° C.

21. The process according to claim 1, wherein the alumina support is provided in the form of beads having a diameter of between 2 and 10 mm.

* * * * *